United States Patent [19]

Nagashima et al.

[11] Patent Number: 4,541,046
[45] Date of Patent: Sep. 10, 1985

[54] DATA PROCESSING SYSTEM INCLUDING SCALAR DATA PROCESSOR AND VECTOR DATA PROCESSOR

[75] Inventors: Shigeo Nagashima, Hachioji; Shunichi Torii, Musashino; Koichiro Omoda; Yasuhiro Inagami, both of Hadano, all of Japan

[73] Assignee: Hitachi, Ltd., Tokyo, Japan

[21] Appl. No.: 361,478

[22] Filed: Mar. 23, 1982

[30] Foreign Application Priority Data

Mar. 25, 1981 [JP] Japan ................................ 56-42314
Sep. 16, 1981 [JP] Japan ............................... 56-144658
Feb. 10, 1982 [JP] Japan ................................ 57-18734

[51] Int. Cl.³ .............................................. G06F 9/18
[52] U.S. Cl. .................................................... 364/200
[58] Field of Search .......................... 364/200 MS File

[56] References Cited

U.S. PATENT DOCUMENTS

| | | | |
|---|---|---|---|
| 4,101,960 | 7/1978 | Stokes | 364/200 |
| 4,128,880 | 12/1978 | Cray | 364/200 |
| 4,270,181 | 5/1981 | Tanakura et al. | 364/200 |
| 4,281,391 | 7/1981 | Huang | 364/746 |
| 4,344,134 | 8/1982 | Barnes | 364/200 |
| 4,365,292 | 12/1982 | Barnes et al. | 364/200 |
| 4,412,303 | 10/1983 | Barnes et al. | 364/200 |
| 4,435,765 | 3/1984 | Uchida et al. | 364/200 |

OTHER PUBLICATIONS

Richard Russell, The Cray-1 System, 1/78, Communications of ACM, vol. 21, No. 1, pp. 63-72.
Richard Stokes, An Assessment of First Generation Vector Computers, Burroughs Corp., pp. 12-17.

*Primary Examiner*—Gareth D. Shaw
*Assistant Examiner*—Daniel K. Dorsey
*Attorney, Agent, or Firm*—Antonelli, Terry & Wands

[57] ABSTRACT

A vector processor comprises a main storage for storing scalar instruction chains and vector instruction chains for executing desired operations, and a scalar processing unit and a vector processing unit for separately fetching the scalar instruction chains and the vector instruction chains, decoding them and executing them so that the scalar processing and the vector processing are carried out in overlap.

25 Claims, 10 Drawing Figures

```
DIMENSION   A(3,100)  B(3,100)  C(3,100)
DO    10    I = 1,3
DO    10    J = 1,100
10    A(I,J) = B(I,J) + C(I,J)
```

DATA PROCESSING SYSTEM INCLUDING SCALAR DATA PROCESSOR AND VECTOR DATA PROCESSOR

BACKGROUND OF THE INVENTION

The present invention relates to a vector process oriented digital electronic computer adapted for carrying out vector operations at a high speed (hereinafter referred to as a vector processor).

A vector processor is a processor capable of high speed operation on a plurality of elements of an ordered set of data (which is called vector data or simply a vector) and another vector stored in a main storage.

FIG. 1 diagrammatically shows an operation for summing vectors B and C to produce a vector A. In the illustrated example, corresponding elements $b_{ij}$ and $c_{ij}$ of the vectors B and C are summed to obtain an element $a_{ij}$ of the vector A. In general, the vector processor can carryout, in addition to the operation for the vector data, a process necessary for the preparation of the vector operation (e.g. calculation of a start address of the vector), which is an ordinary scalar operation, and an input/output process. Typical examples of such a vector processor are STAR-100 of CDC and CRAY-1 of Cray Research Inc.

When a FORTRAN program having doubly nested DO loops is to be executed by the vector operation, only the inner DO loop is processed in the vector operation form and the outer loop is usually processed in a software loop.

As a result, in the prior art vector processor, the vector processing and the scalar processing are sequentially carried out. For example, an operation shown in FIG. 2 is processed as shown in FIG. 3. In FIG. 3, symbols V and S shown at the respective steps represent vector processing and scalar processing, respectively. The respective steps are explained below.

Step 1: Calculate a length of a vector to be processed. (Scalar processing). In the present example, the length is 100 as determined by a range of J.

Step 2: Set the vector length into a vector length register (VLR) by a SETVL instruction (Scalar processing)

Step 3: Calculate a start vector address of the vector B (in the present example, the address of the element B (1, 1)). (Scalar processing)

Step 4: Set the start vector address into a vector address register (VAR) by a SETVAR instruction (scalar processing).

Step 5: Calculate the address increment between the vector elements of the vector B. (In the present example, the increment is 3 because the vector elements are arranged at an interval of two addresses.) (Scalar processing)

Step 6: Set the increment into a vector address increment register (VAIR) by a SETVAIR instruction (Scalar processing)

Step 7: Fetch the vector B from the main storage by a LOADVR instruction by referring the contents, namely the address value in the registers VAR, VAIR and the vector length in the VLR and load it into a #0 vector register (VR0). (Vector processing)

Steps 8-11: Carry out steps similar to the steps 3-6 for the vector C. (Scalar processing)

Step 12: Fetch the vector C from the main storage by the LOADVR instruction by referring the contents of the registers VAR, VAIR and VLR and load it into a #1 vector register (VR1). (Vector processing)

Step 13: Add the elements of the vectors B and C stored in the vector registers VR0 and VR1, respectively, by an ADDVR instruction for the number of elements corresponding to the vector length specified by the vector length register VLR and store the resulting sum into a #2 vector register (VR2). (Vector processing)

Steps 14-17: Carry out steps similar to the steps 3-6 for the vector A. (Scalar processing)

Step 18: Store the content of the vector register VR2 by a STOREUR instruction by referring the contents of the registers VAR, VAIR and VLR. (Vector processing)

Step 19: Increment an Index I by one by an INCREMENT instruction, compare the incremented index I with 100 by a COMPARE instruction, and return to the step 3 if I is not larger than 100 by a BRANCH instruction. (Scalar processing)

Thereafter, the steps 3-19 are repeated until I reaches 100. The start vector address is changed from the initial address B (1, 1) to the addresses B (2, 1), B (3, 1), ... for each repetition. The same is true for the vectors C and A.

In the present example, the scalar processing time occupies approximately 10% of a total processing time. The ratio depends on the number of vector elements to be processed. Usually, the number of vector elements processed ranges from 10 to 1000 or more. In actual practice, an upper limit on the number of vector elements which can be continuously processed in one vector processing is equal to the number of vector elements which can be retained in one vector register (i.e. vector register length), and hence if the number of vector elements to be processed is larger than the vector register length, the vector processing must be carried out in a plurality of cycles. For example, if the vector register length is 64 and the number of vector elements is 100, the vector processing is completed when the processing of FIG. 2 is repeated twice (64 vector elements in the first cycle and 36 vector elements in the second cycle). In this case, the ratio (overhead) of the scalar processing time to the total processing time amounts to as much as 20%. In general, with the presently available computer hardware technology, it is not always easy to increase the processing speed of the scalar processing or the vector processing. This imposes a significant limitation in increasing the speed of the vector operation. Thus, with the prior art it is difficult to increase the speed of the vector operation.

SUMMARY OF THE INVENTION

It is an object of the present invention to provide a vector processor which can carry out scalar processing and vector processing in parallel to substantially decrease the overhead of the scalar processing and substantially increase the speed of the vector operation.

In order to achieve the above object, in accordance with the vector processor of the present invention, an instruction chain to be executed for an intended processing is divided into a scalar instruction chain and a vector instruction chain and they are separately stored in a main memory. A separate scalar processing unit and a vector processing unit for separately fetching the scalar instruction chain and the vector instruction chain and decoding and executing them are provided to carry out the scalar processing and the vector processing in an overlapping manner.

DESCRIPTION OF THE PREFERRED EMBODIMENTS

Figure 4:
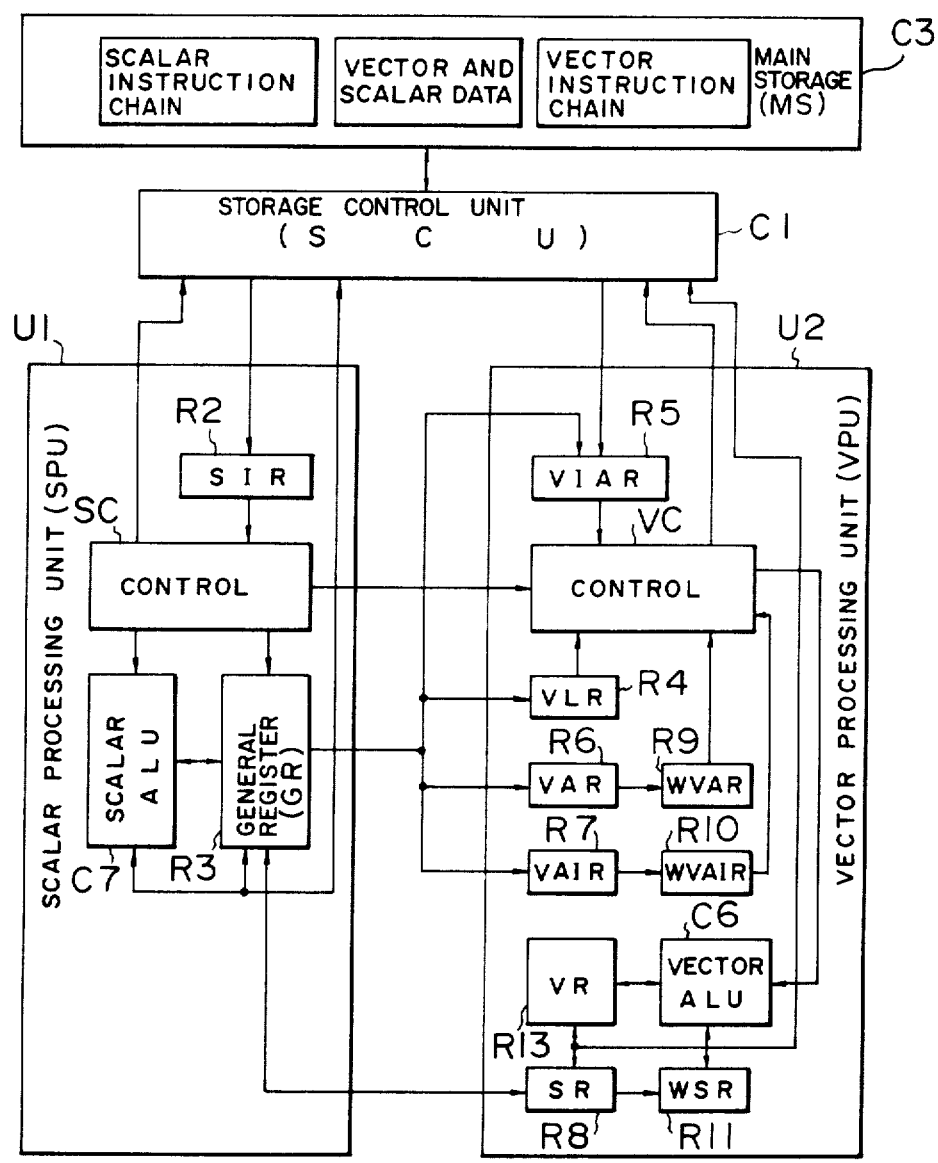
FIG. 4 shows an overall configuration of a vector processor in accordance with a first embodiment of the present invention.

Referring to FIG. 4, the vector processor of the present invention comprises a scalar processing unit (SPU) U1, a vector processing unit (VPU) U2, a main storage (MS) C3 common to both units, and a storage control unit (SCU) C1. Stored in the MS C3 are a scalar instruction chain to be executed by the SPU U1 and a vector instruction chain to be executed by the VPU U2, as well as vector and scalar data, all of which may be accessed by the SCU C1.

The SCU C1 responds to a data or scalar instruction fetch request from the SPU U1 to fetch data or a scalar instruction specified by an address supplied from the SPU U1, from the MS C3 and supplies it to the SPU U1. The SCU C1 also responds to a data store request from the SPU U1 to store data supplied from the SPU U1 in the MS C3 at a storage location specified by an address supplied from the SPU U1. Similarly, the SCU C1 responds to a data or vector instruction fetch request from the VPU U2 to access the MS C3 and supplies fetched data or a vector instruction to the VPU U2. The SCU C1 also responds to a data store request from the VPU U2 to access the MS C3.

In this manner, the SCU C1 of the present invention separately responds to the access requests from the SPU U1 and the VPU U2.

The SCU C1 comprises a scalar instruction register (SIR) R2, general purpose registers (GR's) R3, a scalar ALU C7 and a controller SC for controlling those elements, and it executes the scalar instruction chain in the MS C3. The scalar instruction chain includes general scalar instructions such as those shown in the IBM manual "System/370 Principles of Operation" (GC-22-7000). In accordance with those instructions, the scalar data in the GR R3 or the MS C3 is scalar-processed and the result is stored in the GR R3 or the MS C3.

The SPU U1 of the present invention executes, in addition to the above scalar instructions, scalar instructions which call for reading out information necessary to operate the VPU U2 from the GR R3 or the MS C3 and for supplying the read information to the VPU U2, and a scalar instruction which calls for starting the VPU U2. As a result, the scalar data necessary for the vector operation to be carried out by the VPU U2, the number of elements of the vector data (vector length) to be vector-processed, the start element address of the vector data and, the address increment between the vector data elements are loaded into scalar registers (SR's) R8, a vector length register (VLR) R4, vector address registers (VAR's) R6 and vector address increment registers (VAIR's) R7, respectively, and the start instruction address of the vector instruction chain to be executed is loaded into a vector instruction address register (VIAR) R5. When the VPU U2 is started by the SPU U1, it transfers the contents of the VAR's R6, the VAIR's R7 and the SR's R8 to working VAR's (WVAR's) R9, working VAIR's (WVAIR's) R10 and working SR's (WSR's) R11, respectively, and fetches the vector instruction chain starting from the vector instruction specified by the VIAR R5 from the MS C3 through the SCU C1 under a control of a controller vector instruction controller VC by referring to the working registers and the VLR R4, and carries out the vector operation in a vector ALU C6 by referring to a vector register (VR) R13 and the WSR's R11.

After the SPU U1 has started the VPU U2, it executes the scalar instruction to read out the data necessary for the next vector processing operation from the GR R3 and to load the data into the VAR R6, the VAIR R7 and the SR R8.

In this manner, while the VPU U2 is started and carries out the vector operation, the SPU U1 parallelly carries out the scalar processing for the next vector processing operation.

Figure 5:
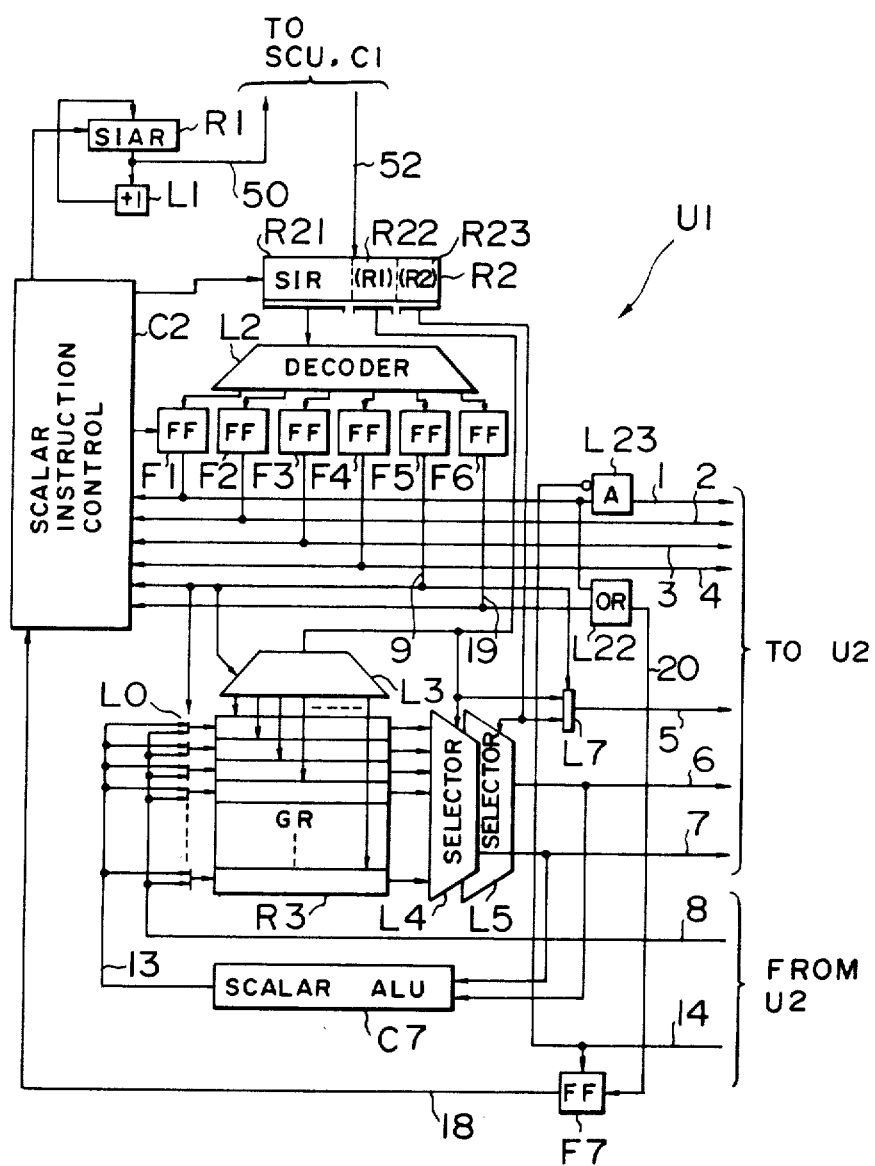
FIG. 5 shows a configuration of a scalar processing unit used in the first embodiment.
Figure 6:
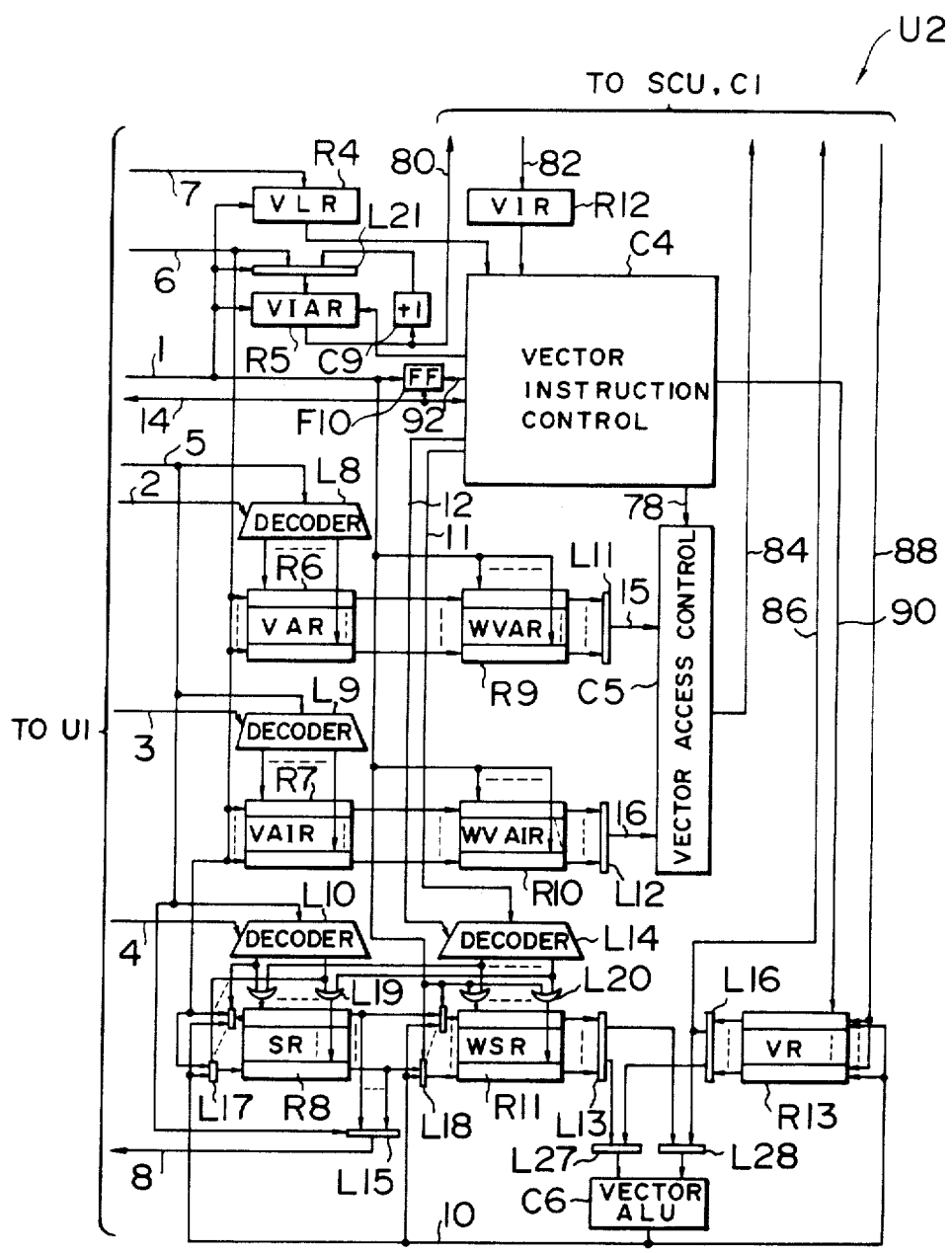
FIG. 6 shows a configuration of a vector processing unit used in the first embodiment.

FIGS. 5 and 6 show details of the SPU U1 and the VPU U2, respectively. The detailed operations thereof are now explained with reference to a flow chart of FIG. 7. In FIG. 5, those portions which relate to ordinary scalar instruction execution are omitted for the purpose of simplicity.

Of the scalar instructions executed by the SPU U1, six instructions which are particularly pertinent to the present invention are explained below. Each of those instructions comprises an operation code field and two fields (R1, R2) for specifying first and second register operands.

(1) Start Vector Processor (SVP) instruction:

This instruction call for starting the VPU U2 and loads the vector length and the vector instruction address into the VLR R4 and the VIAR R7, respectively. The R1 field of the instruction specifies the address of the GR R3 which contains the vector length, and the R2 field specifies the address of the GR R3 which contains the address of the MS C3 of the vector instruction chain to be executed.

(2) Set Vector Address Register (SVAR) instruction:

This instruction calls for setting the start address of the vector data to be processed into the VAR R6 in the VPU U2. The R1 field of the instruction specifies the address of the VAR R6 which contains the address to be set, and the R2 field specifies the address of the GR R3 which contains the start address of the vector data to be processed.

(3) Set Vector Address Increment Register (SVAIR) instruction:

This instruction calls for setting the address increment of the vector elements to be processed into the VAIR R7 of the VPU U2. The R1 field of the instruction specifies the address of the VAIR to which the address increment is to be set and the R2 field specifies the address of the GR R3 which contains the vector address increment to be set.

(4) Set Scalar Register (SSR) instruction:

This instruction calls for setting the scalar data for the vector processing into the SR R8. The R1 field of the instruction specifies the address of the SR R8 to which the scalar data is to be set, and the R2 field specifies the address of the GR R3 which contains the scalar data to be set.

(5) Read Scalar Register (RSR) instruction:

This instruction calls for the SPU U1 to read the scalar data resulting from the preceding vector processing (by, for example, an inner product operation instruction or a vector sum operation instruction) to set it into the GR R3. The R1 field of the instruction specifies the address of the SR from which the scalar data is to be read, and the R2 field specifies the address of the GR R3 into which the scalar data is set.

(6) Test Vector Processor (TVP) instruction:

This instruction calls for testing the status of the VPU U2 to set a condition code. The R1 and R2 fields of the instruction are not used. When the VPU U2 is in operation, the condition code is set to "1", and when it is not in operation, the condition code is set to "0". The condition code is utilized by a Branch on Condition instruction as described in the IBM manual "System/370 Principles of Operation" (GC-22-7000).

Now, referring to FIG. 5, in the SPU U1, a scalar instruction address in a scalar instruction address register (SIAR) R1 is sent to the SCU C1 through a line 50 and the SCU C1 fetches the scalar instruction from the MS C3 and sets it into the scalar instruction register (SIR) R2 through a line 52. The operation code field R21 of the instruction is decoded by a decoder L2 so that one of flip-flops (FF) F1-F6 corresponding to the instruction is set and the output of the FF is sent to a scalar instruction control C2 for use in the execution of the instruction. The content of the SIAR R1 is incremented by one by an incrementer L1 to point to the next instruction and the incremented address is again set to the SIAR R1. Those series of steps are controlled by the scalar instruction control C2 such that the instructions are sequentially fetched and set into the SIR R2 and executed. The six instructions described above which are pertinent to the present invention are explained below and the explanations for the other instructions are omitted here. The FF F1-F6 are set by the SVP instruction, the SVAR instruction, the SVAIR instruction, the SSR instruction, the RSP instruction and the TVP instruction, respectively.

Figure 7:
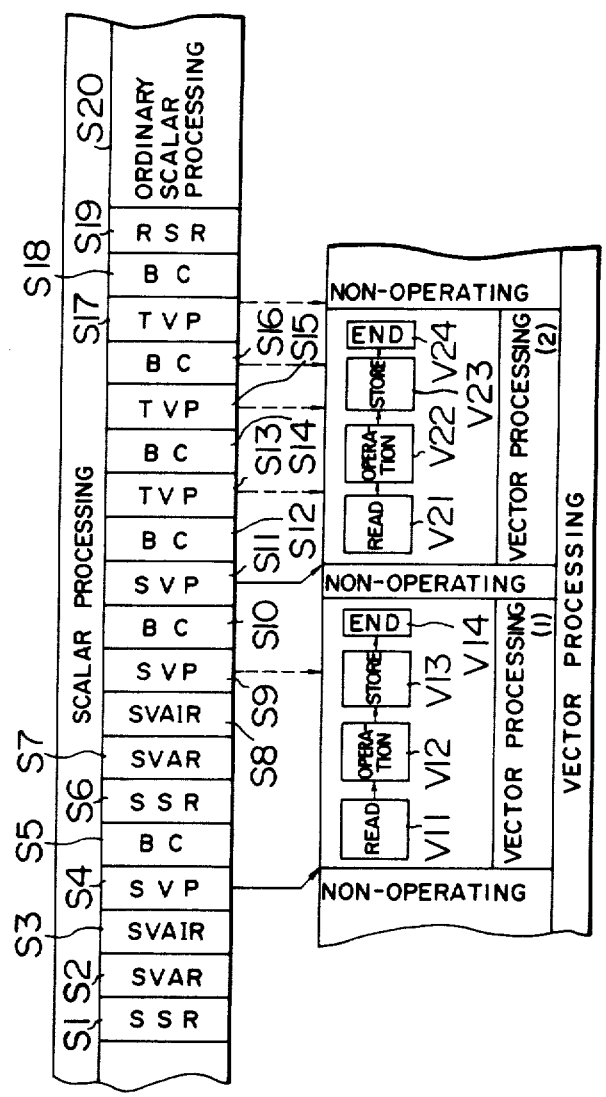
FIG. 7 shows a flow chart of the scalar processing and the vector processing in the first embodiment.

In initiating the vector processing (1) of FIG. 7 in the VPU U2, the SPU U1 carries out step S1-S5 (FIG. 7) to prepare the necessary address and data.

Step S1

As the SSR instruction is set in the SIR R2 and the operation code field R21 thereof is decoded by the decoder L2, the FF F4 is set and the output of the FF F4 is sent to the scalar instruction control C2 through a line 4 so that the instruction is executed. The content of the R2 field R23 of the SIR R2 is supplied to a selector L5 which in turn reads out the scalar data necessary for the vector processing (1) from one of the GR's R3 specified by the instruction onto a line 6. The content of the R1 field R22 of the SIR R2 is supplied to a selector L7 which is connected to the FF F5 through a line 9. When the FF F5 is not in a set state, the selector L7 selects the content of the R1 field R22, and when the FF F5 is in the set state, the selector L7 selects the content of the R2 field R23, and the selected content is sent out to a line 5. Thus, for the SSR instruction, the selector L7 selects the output of the R1 field R22. As a result, the address of the SR R8 specified by the SSR instruction is supplied to a decoder L10 (FIG. 6) in the VPU U2 through the line 5. The output of the FF F4 is supplied to the decoder L10 through the line 4. Since the FF F4 is in the set state for the SSR instruction, the decoder L10 is conditioned by the set output of the FF F4 to decode the address of the SR R8 supplied through the line 5. An OR gate L19 and a selector 17 are provided for each of the SR's R8. The decoder L10 sends a "1" signal to the corresponding OR gate L19 and the corresponding selector L17 of the SR R8 which corresponds to the supplied address of the SR R8 in order to set the scalar data on the line 6 to that SR R8. The corresponding selector L17 responds to the "1" signal from the decoder L10 to select the scalar data on the line 6 and send it out to the corresponding SR R8. The corresponding SR R8 responds to the output of the OR gate L19 to set therein the input data from the selector L17. In this manner, the scalar data necessary for the execution of the vector processing (1) is set in the SR R8. The SSR instruction is repetitively used until all the scalar data to be prepared for the vector processing (1) are set in the SR R8. The selector L17 connected to the SR R8 functions to select the output of the vector ALU C6 or the data on the line 6 and set the selected one to the SR R8.

Step S2

The SVAR instruction is set in the SIR R2 and the FF F2 is set by the instruction. The output of the FF F2 is supplied to the scalar instruction control C2 through a line 2 and the instruction is executed under the control of the scalar instruction control C2. The content of the R2 field R23 of the instruction is supplied to a selector L5, which selects one of the GR's R3 specified by the R2 field R23 and sends out the content of that GR R3 to the VAR R6 (FIG. 6) through a line 6. The data on the line 6 is a memory address of the vector data necessary to the vector processing (1). The R1 field of the instruction contains the address of the VAR. When it is selected by a selector L7, it is supplied to a decoder L8 (FIG. 6) through the line 5. The decoder L8 is conditioned by the set output of the FF F2 on the line 2 to decode the address of the VAR specified by the R1 field to set the address of the vector data on the line 6 in a corresponding register within the VAR R6. In this manner, the memory address of the vector data to be prepared for the vector processing (1) is set in the corresponding register within the VAR R6. The SVAR instruction is repetitively used until all of the memory addresses of the vector data to be prepared for the vector processing (1) are set in the VAR R6.

Step S3

The SVAIR instruction is set in the SIR R2 and the FF F3 is set by the instruction. The set output of the FF F3 is supplied to the scalar instruction control C2 through a line 3 to control the instruction execution and condition a decoder L9 (FIG. 6). The R2 field of the instruction is supplied to the selector L5, which reads out the address increment of the vector data necessary for the vector processing (1) from the GR R3 to the VAIR R7 (FIG. 6) through the line 6. On the other hand, the R1 field of the instruction is selected by the selector L7 and supplied to a decoder L9 (FIG. 6) through the line 5. The decoder L9 sets the data on the line 6 in the VAIR R7 specified by the address of the VAIR on the line 5. This instruction is also repetitively used as many times as required.

Step S4

As the settings to the VAR R6, the VAIR R7 and the SR R8 have been completed, the SVP instruction is executed to instruct the VPU U2 to start the execution of the vector instruction. When the SVP instruction is set in the SIR R2, the FF F1 is set and the "1" output thereof is supplied to the scalar instruction control C2 and to the VPU U2 through the signal line 1. If the VPU U2 is in operation at this time, a "1" signal indicating in-operation is present on a signal line 14. This signal inhibits an AND gate L23 to prevent the output of the FF F1 from being supplied to the VPU U2. In response to the set output of the FF F1 supplied from an OR gate L22 through a line 20, the content on the signal line 14 is set in the FF F7. As a result, for the SVP instruction, the FF F7 is set to "1" if the VPU U2 is in operation and it is set to "0" if the VPU U2 is not in operation. The first and second register address fields R22 and R23 of the SIR R2 are supplied to the selectors L4 and L5, respectively, which select the outputs of the GR's R3. Those selectors read out the vector length and the vector instruction start address from a register in the GR's R3 specified by the respective fields and send them to the VPU U2 through the signal lines 7 and 6, respectively. If the VPU U2 of FIG. 6 is not in operation at that time, the VPU U2 responds to a signal indicating that the SVP instruction has been executed, from the signal line 1 to carrry out the following operation. First, the VLR R4 responds to the signal on the line 1 to store the vector length of the vector to be processed on the signal line 7. The selector L21 responds to the "1" signal on the line 1 to select the vector instruction start address on the signal line 6 and the VIAR R5 responds to the signal on the line 1 to store the selected address therein. Working vector address registers (WVAR's) R9 respond to the "1" signal on the line 1 to receive (copy) the contents of all of the VAR's R6. For this purpose, each of the WVAR's is connected to the line 1 and the corresponding one of the VAR's R6 and responds to the "1" signal on the line 1 to store therein the content of the corresponding VAR R6. Working vector address increment registers (WVAIR's) R10 are connected to the line 1 and the VAIR's R7 in a similar way so that each register of the WVAIR's R10 responds to the "1" signal on the signal line 1 to receive (copy) the content of the corresponding VAIR R7. In a similar way, working scalar registers (WSR's) R11 copy the contents of the SR's R8. In order to supply the signal on the output line 10 of the vector ALU C6 of the VPU U2 to the WSR's R11 as well as to the SR's R8, selectors L18 for selecting the output lines from the SR's R8 and the output line 10 from the vector ALU C6 are connected to the input terminals of the WSR's R11. Each of the selectors L18 selects the output of the corresponding SR R8 when the signal on the signal line 1 is "1". Each of the WSR's R11 responds to an output of a corresponding one of the OR gates L20 to store therein the output of the corresponding selector L18. The signal line 1 is connected to the OR gates L20. Accordingly, when the "1" signal is produced on the signal line 1, each of the WSR's R11 stores therein the content of the corresponding SR R8. The numbers of registers of the WVAR's R9, the WVAIR's R10 and the WSR's R11 are of course equal to the numbers of registers of the VAR's R6, the VAIR's R7 and the SR's R8, respectively. The signal line 1 is also connected to the FF F10 to set it and the set output thereof is supplied to the vector instruction control C4 to instruct start of the execution of the vector processing.

As seen from the above description, when the SVP instruction is carried out by the SPU U1, the vector length is set in the VLR R4 and the start address of the vector instruction chain is set in the VIAR R5 and the contents of the VAR's R6, the VAIR's R7 and the SR's R8 are copied in the WVAR's R9, the WVAIR's R10 and the WSR's R11, respectively. Thus, the vector instruction processing (1) is ready to be started.

If the VPU U2 is in operation when the SVP instruction is decoded, only the FF F7 is set to "1" and other processings are not carried out.

Step S5

The SPU U1 issues a Branch on Condition instruction to check if the VPU U2 has been started by the SVP instruction. When the Branch on Condition instruction is decoded by the decoder L2, the scalar instruction control C2 detects the output of the FF F7 indicating the condition code through the line 18 in order to decide whether the instruction is to be executed. As explained in the step S4, the "1" output of the FF F7 indicates that the VPU U2 is in operation when the SVP instruction is decoded and hence the start by the SVP instruction has failed. Accordingly, when the output of the FF F7 is "1", the scalar instruction control C2 again executes the previous SVP instruction, and when the output of the FF F7 is "0", the scalar instruction control C2 controls the content of the SIAR R1 so that the branch to the next scalar instruction routine takes place. A circuit of the SPU U1 for executing the branch instruction is not shown for the purpose of simplicity but it may be implemented by a known technique.

Steps S6–S12

When the SPU U1 detects that the start of the VPU U2 has succeeded by the execution of the Branch on Condition instruction, the SPU U1 carries out steps S7–S8 for setting the scalar data, the vector addresses and the vector address increments necessary for executing the next vector processing (2) in the SR's R8, the VAR's R6 and the VAIR's R7, respectively, in the same manner as the steps S1–S3. Since the contents of the SR's R8, the VAR's R6 and the VAIR's R7 have been saved to the WSR's R11, the WVAR's R9 and the WVAIR's R10, respectively, by the previous SVP instruction, the SPU U1 can carry out the scalar processing in parallel with the execution of the vector processing (1) after the completion of the step S8, the SPU U1 executes the SVP instruction (step S9) in the same manner as described above and then executes the Branch on Condition instruction (step S10). If the SPU U1 detects the failure of start due to the VPU U1 being in operation, it again executes the SVP instruction and the Branch on Condition instruction (steps S11 and S12), and if it detects the success of start, it goes to the next step.

The operation of the VPU U2 is now explained.

Figures 1, 2:
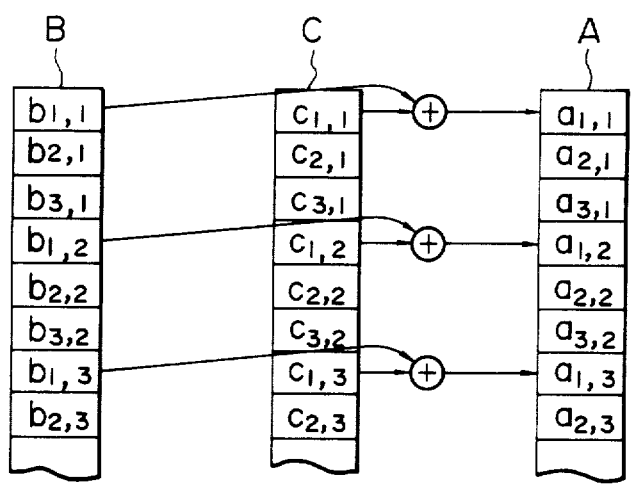
FIG. 1 illustrates a manner of vector processing.
FIG. 2 shows a FORTRAN program for an operation in the vector processing.
Figure 3:
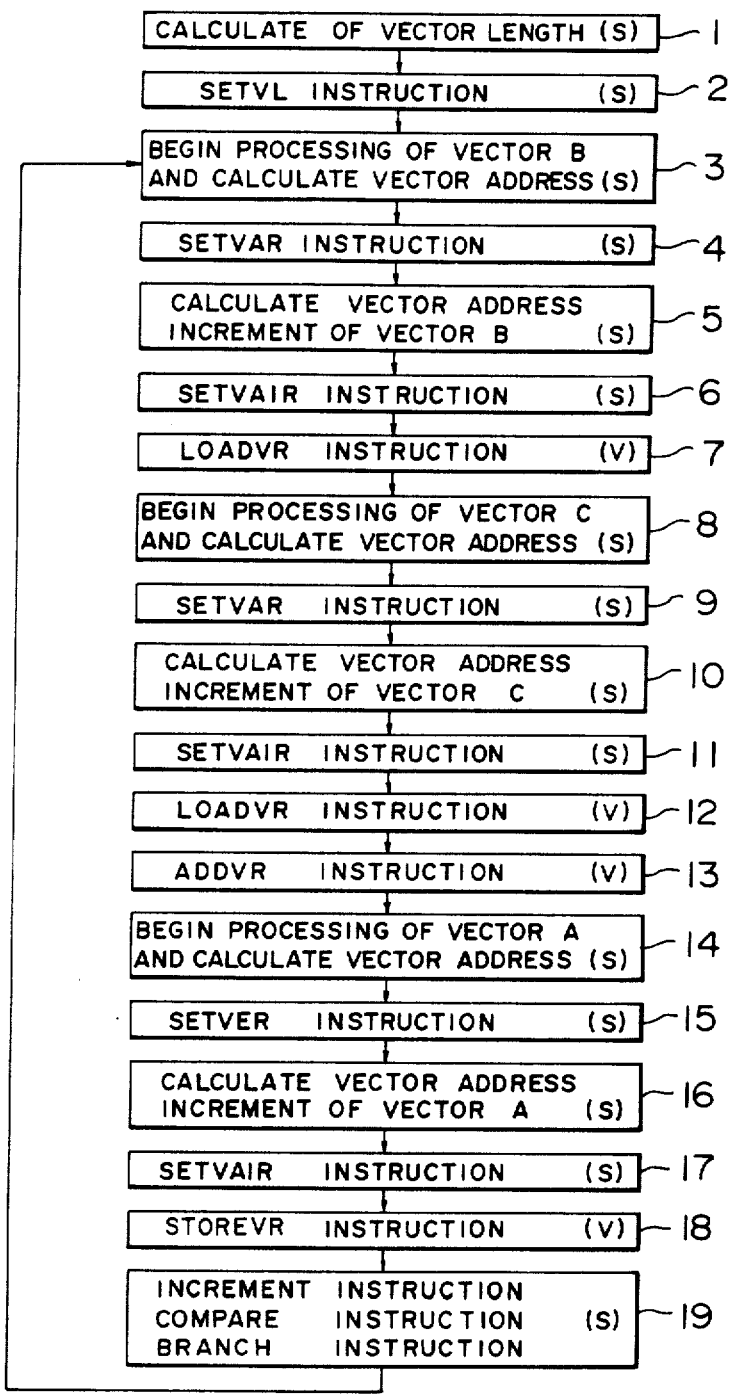
FIG. 3 shows a process flow of a prior art vector processor.

The VPU U2 can execute the instructions shown in the flow chart of FIG. 3 and other instructions. In the following description, only the instructions necessary to understand the present invention and the operations of the VPU U2 for executing those instructions are explained.

Step V11

When the SVP instruction is executed in the SPU U1, the "1" signal on the line 1 sets the FF F10 of the VPU U2 and the "1" output of the FF F10 starts operation of the vector instruction control C4. The output of the FF F10 is sent to the SPU U1 through the line 14 to inform it that the VPU U2 is in operation. As the vector instruction control C4 is started, the vector instruction address previously set in the VIAR R5 is sent to the SCU C1 through the line 80, and based on the vector instruction address, the first instruction of the vector instruction chain in the MS C3 is fetched and set in the VIR R12 through the SCU C1 and the line 82. The vector instruction control C4 has a known circuit to decode the instruction in the VIR R12 and control the execution thereof. As the LOADVR instruction is set in the VIR R12, the vector instruction control C4 sends out the vector data length stored in the VLR R4 and the address of the VAR specified by the instruction to a vector access control C5 through the line 78 to start the vector access control C5, which in turn controls the selector L11 to read out the start address of the vector data (e.g. the memory address of the start element B(1) of the vector data B) from the WVAR R9 specified by the VAR address through the line 15 and further controls the selector L12 to read out the vector data address increment from the WVAIR R10 specified by the VAR address through the line 16, and based on that read data, sequentially supplies main storage addresses for fetching the specified vector data length of elements of the vector data B, to the SCU C1 through the line 84. As a result, the elements of the vector data B are sequentially read out on the line 88. On the other hand, the vector instruction control C4 sets the read vector data B into the VR R13 specified by the LOADVR instruction through the line 90. The LOADVR instruction is repetitively executed until all the vector data necessary for the vector processing (1) is set in the VR's R13. In this manner, the vector data, e.g. A and B are set in the VR's R13.

The vector instruction control C4 repeatedly sets the next instruction address, which is supplied from the incrementer C9 through the selector L21, in the VIAR R5. As a result, the updated address in the VIAR R5 is sequentially sent to the SCU C1 through the line 80 and the vector instruction is sequentially fetched from the MS C3 and set in the VIR R12. In this manner, the vector instruction chain is executed. When the vector operation instruction, e.g. ADDVR instruction is set in the VIR R12, the vector instruction control C4 controls the selectors L16, L27 and L28 in a known manner to sequentially read out the two vectors, e.g. A and B specified by the instruction from the vector registers (VR's) R13, one element at a time, and send them to the vector ALU C6.

Step V12

The vector ALU C6 carries out the operation for the elements of the input vector data in a known pipeline mode.

Step V13

As soon as the result of the vector operation is produced, the vector instruction control C4 store the result in the VR R13 specified by the instruction, by a known technique.

The operation for an element i of the vector data and the storing of the operation result for the previous element (i−1) are carried out in parallel.

As the STORE VR instruction is executed, the vector access control C5 sequentially generates for the respective elements the addresses of the MS C3 at which the vector elements are to be stored by referring the WVAR R9 and the WVAIR R10, and sends the addresses to the MS C3 through the line 84 and the SCU C1. The vector to be stored is sequentially read out, one element at a time, from the VR R13 and sent to the MS C3 through the selector L16, the line 86 and the SCU C1 and is stored in the MS C3 by referring the addresses supplied from the vector access control C5.

Step V14

The vector instruction control C4 has a known circuit (not shown) for detecting the completion of the execution of the last vector instruction of the vector instruction chain, and a circuit (not shown) for resetting the FF F10 by the output of the detection circuit through the line 92. Accordingly, when the execution of the vector instruction chain is completed, the FF F10 is reset and the output thereof is sent to the SPU U1 through the line 14. Thus, the vector processing (1) terminates and the VPU U2 is no longer in operation.

Under this condition, when the SVP instruction is executed by the SPU U1 (step S11), the data necessary for executing the next vector processing (2) is set in the VAR's R6, the VAIR's R7 and the SR's R8 of the VPU U2.

Steps V21 and V22

If the newly started vector processing (2) needs a vector operation which uses the scalar data in the WSR R11 and the vector data in the VR R13, the vector instruction control C4 controls the selectors L13 and L27 to read out the scalar data from the WSR R11 specified by the decoded instruction and sends it to the vector ALU C6, and also controls the selectors L16 and L28 to read out the vector data from the VR R13 specified by the decoded instruction and sends it to the vector ALU C6. Thus, the operation of the scalar data and the vector data is carried out. If the scalar operation using only the scalar data is carried out in the vector processing (2), two scalar data are read out to the selector L13 and sent to the vector ALU C6 through the selectors L27 and L28. The vector ALU C6 can carry out the scalar operation, too.

Steps V23 and V24

If the instruction executed in the steps V21 and V22 is an instruction for producing scalar data, for example, an instruction for producing an inner product of vector data, the vector instruction control C4 sends out the scalar register address specified by the instruction to the decoder L14 through the line 11 and sends out to the line 12 a signal for starting the decoder L14. The circuit therefore is not shown for the sake of simplicity. The decoder L14 sends a "1" signal to that one of the OR gates 120 provided one for each of the WSR's R11 which corresponds to the input scalar register address.

The control signals to the selectors L18 connected to the WSR's R11 are supplied through the line 1. As described above, when the VPU U2 is in operation, the signal on the line 1 is "0" and the selectors L18 select the data on the output line 10 of the vector ALU C6 and supply it to the corresponding WSR's R11. In this manner, the scalar data resulting from the operation is stored in the WSR R11 corresponding to the register address specified by the instruction. In the present invention, the scalar data is set in the WSR R11 as well as in the SR R8 in the following manner. The output lines of the decoder L14 are connected to the corresponding OR gates L19. Thus, the signal "1" is supplied to the SR R8 corresponding to the scalar register address specified by the instruction. The control signals to the selectors L17 connected to the input terminals of the respective SR's R8 are the signal produced by the decoder L10, which signal is "0" when the VPU U2 is in operation. Thus, the selectors L17 select the data on the output line 10 of the vector ALU C6. In this manner, the scalar data resulting from the operation is stored in the SR R8 corresponding to the scalar register address specified by the instruction.

The scalar data is stored into the WSR R11 in order to permit the operation using the scalar data in the vector processing (2). The same scalar data is stored into the SR R8 in order to render the scalar data resulting from the vector processing (2) available in another vector processing. As described above, when the next vector processing is started, the content of the SR R8 is transferred to the WSR R11 so that the scalar data written in the SR R8 is rendered available in the next vector processing. When the scalar data has been stored, the vector instruction control C4 carries out the same end step as the step V14. Thus, the vector processing (2) is terminated.

Steps S13–S18

If the SPU U1 wants to refer to the scalar data resulting from the vector processing (2) after the SPU U1 has started the vector processing (2), the SPU U1 executes the TVP instruction to check if the VPU U2 is in operation or not.

Referring to FIG. 5, when the TVP instruction is set into the SIR R2, it is decoded by the decoder L2 and the FF F6 is set. The output of the FF F6 is sent to the scalar instruction control C2 through the line 19 and sent to the FF F7 through the OR gate L22 and the line 20 to set the FF F7. The data input terminal of the FF F7 is connected to the signal line 14 which indicates the operation status of the vector processing by the VPU U2. When the vector processing is in progress, the FF F7 is set to "1", when it is not in progress, the FF F7 is set to "0". The FF F7 is a portion of the condition code and the output thereof is sent to the scalar instruction control C2 through the line 18 (step S12).

Thereafter, the Branch on Condition instruction is loaded to the SIR R2 and the states ("1" or "0") of the output of the FF F7 are examined (step S14). If the output of the FF F7 is "1", the TVP instruction and the Branch on Condition instruction are executed repeatedly (steps S13–S19).

Step S19

When the FF F7 is set to "0" after the completion of the vector processing (2), it is determined that the branching has succeeded and the RSR instruction is executed.

Referring to FIG. 5, when the RSR instruction is set into the SIR R2, it is decoded and the FF F5 is set. The output of the FF F5 is sent to the scalar instruction control C2 through the line 9 and supplied to the control input of the selector L7. Since the signal on the signal line 9 is "1", the selector L7 selects the content of the second register field R23 of the SIR R2 and sends it to the VPU U2 through the signal line 5. As shown in the VPU U2 of FIG. 6, the signal line 5 is connected to the selector L15. The selector L15 selects the output of the SR R8 specified by the instruction and sends it to the SPU U1 through the signal line 8. In the SPU U1 shown in FIG. 5, the data on the signal line 8 is supplied to the GR R3 through the selector L0, which selects the output line 13 of the scalar ALU C7 of the SPU U1 or the data line 8 connected to the SR R8 depending on whether the output of the FF F5 is "0" or "1". In the present example, the data line 8 is selected. The decoder L3 decodes the content of the first register field R22 of the SIR R2 to determine one of the GR's R3 to which the data is loaded. If the signal on the signal line 9 is "1", the decoder L3 is activated so that the decoder L3 sends out a write signal to the GR R3 specified by the instruction. In the present example, the scalar data on the data line 8 is loaded. When the scalar processing steps S1–S19 for starting the vector processing have been completed, the SPU U1 can carry out an ordinary scalar processing S20.

In the first embodiment described above, if there occur the loading into the SR and the WSR in the VPU U2 and the loading of the SSR instruction from the SPU U1 to the same SR when the VPU U2 is in operation, the loadings to the SR collide. If the loading to the SR by the setup from the SPU U1 is carried out first, the result of the VPU U2 is left in the SR, and if the loading of the scalar result of the VPU U2 to the SR is carried out first, the setup data is left in the SR. In other words, in such a case the vector processing and the scalar processing cannot be overlapped. It is thus necessary to complete the operation of the VPU U2, read out the result, setup the data and then start the vector processing again.

A second embodiment which overcomes the above problem and enables the overlap of the setup and the vector processing for the same register is explained below.

Figure 8:
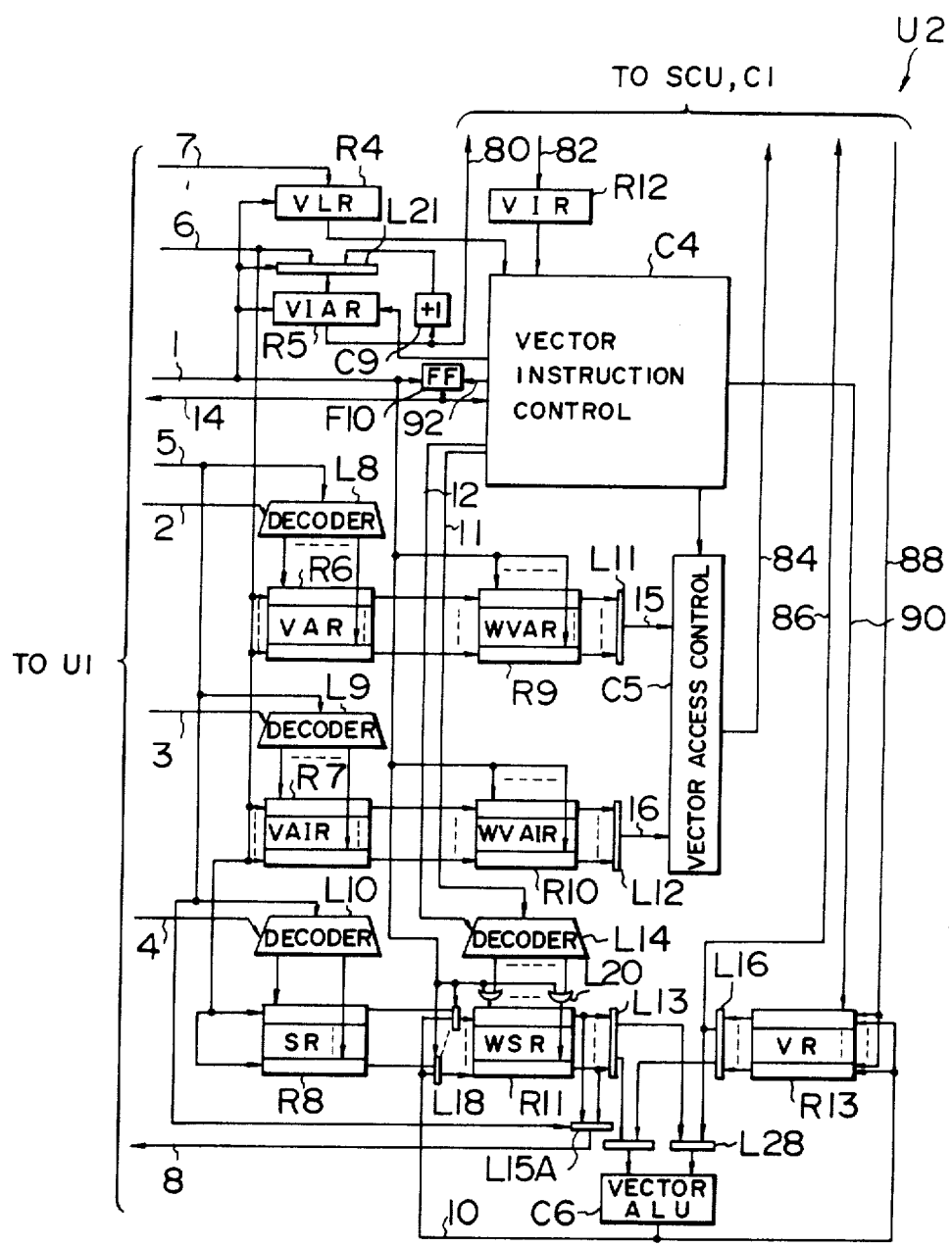
FIG. 8 shows a configuration of a vector processing unit in accordance with a second embodiment of the present invention.

In the second embodiment, a VPU shown in FIG. 8 is used. It differs from the VPU U2 shown in FIG. 6 in that a selector L15A for selecting the output of the WSR R11 is provided and the output of the selector L15A is supplied to the SPU U1 through the line 8, and that the output of the vector ALU C6 is not supplied to the SR R8.

Only the differences in the operation are briefly explained below.

The scalar data on the line 6 is set into the SR R8 in the same manner as the first embodiment. However, since the output of the vector ALU C6 is not supplied to the SR R8 in FIG. 8, the selection by the selector L17 in FIG. 6 is not necessary. The data in the SR R8 is transferred to the WSR R11 when the SVP instruction is executed, as is the case of the first embodiment. In the steps V23 and V24, the output of the vector ALU C6 is set to the WSR R11 as is the case of the first embodiment. In the step S19, when the scalar data produced in the VPU U2 is read out by the RSR instruction, the selector 15A selects the output of the WSR R11 specified by the register address on the line 5 and sends it to the SPU U1 through the line 8.

Since the SR R8 is used only to load the data from the SPU U1, the loading of the data to the SR R8 and the loading of the output of the vector ALU C6 to the WSR R11 can be carried out in parallel.

In the two embodiments described above, the SPU U1 fetches the data to be set in the VPU U2 from the MS C3 before the setting thereof, stores it in the GR R8, and reads out the stored data from the GR R3 and sets it in the VPU U2 in response to the set data instruction. By modifying the instruction such that the set data instruction instructs to fetch the data to be set in the VPU U2 from the MS C3 and modifying the SPU U1 such that it sends the data fetched from the MS C3 directly to the VPU U2 without routing the GR R3 in response to the set data instruction, the setup speed is increased.

A third embodiment which is a modification of the first embodiment for implementing the above is now explained.

Figure 10:
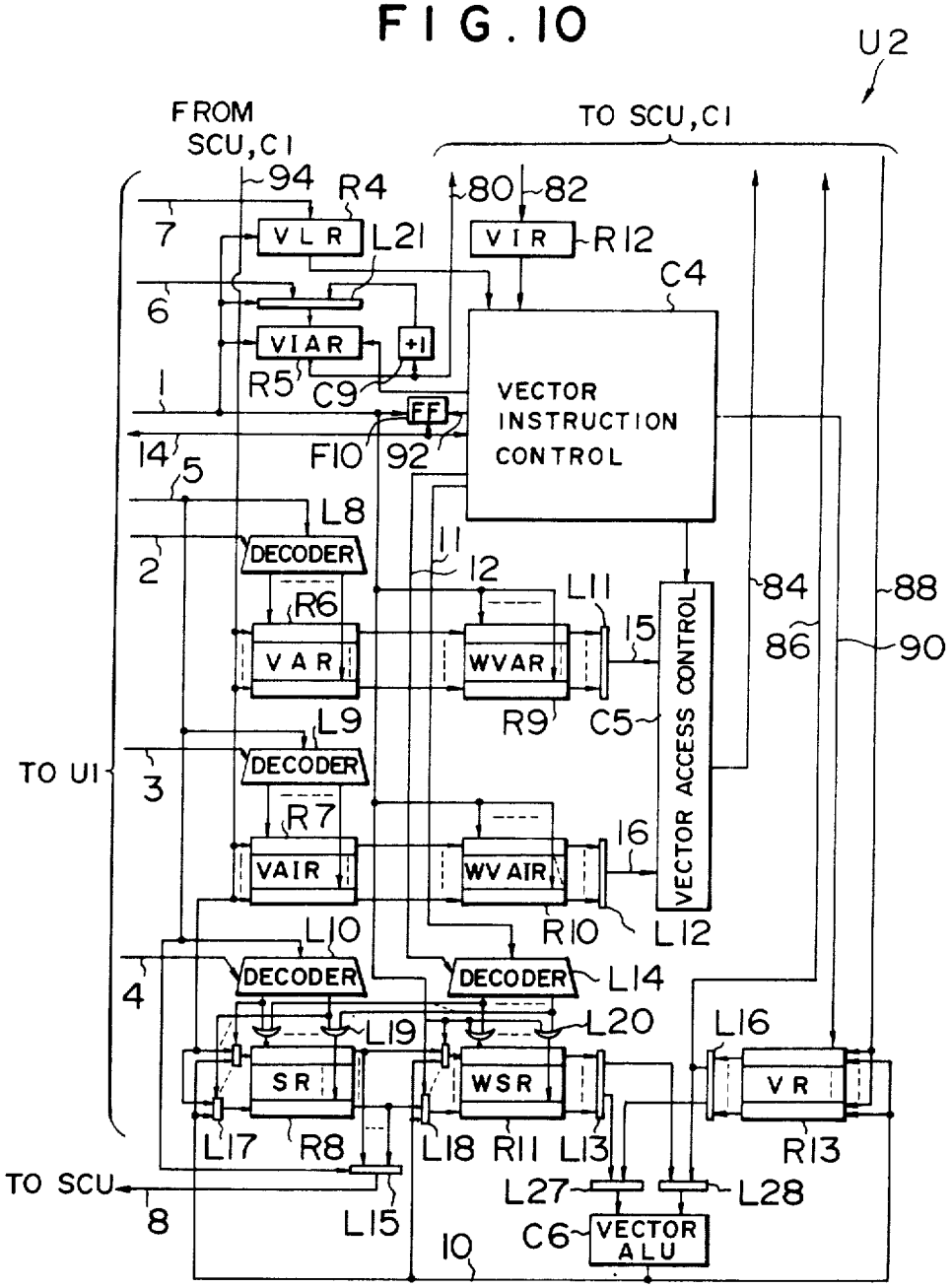
FIG. 10 shows a configuration of a vector processing unit in accordance with the third embodiment of the present invention.

In the third embodiment, the R2 field of the instruction contains an address of the MS C3 at which the data to be used as an operand is stored. For example, the R2 fields of the SVP instruction, the SVAR instruction, the SVAIR instruction, the SSR instruction and the RSR instruction contain the address of the vector instruction chain, the address at which the start address of the vector data is stored, the address at which the address increment is stored, the address of the scalar data from which it is to be read and the address of the scalar data at which it is to be stored, respectively. In this connection, the signal line 6 for sending the content of the field R23 of the SIR R2 of the SPU U1 to the SCU C1 is provided. The signal line 6 is also connected to a selector L21 (FIG. 10). The SCU C1 responds to the address on the line 6 to fetch the data from the MS C3 and sends it to the VAR R6, the VAIR R7 and the SR R8 in the VPU U2 through the line 94. The scalar data is sent to the SCU C1 from the SR R8 through the line 8. The differences from the first embodiment are briefly explained below.

Step S1

Figure 9:
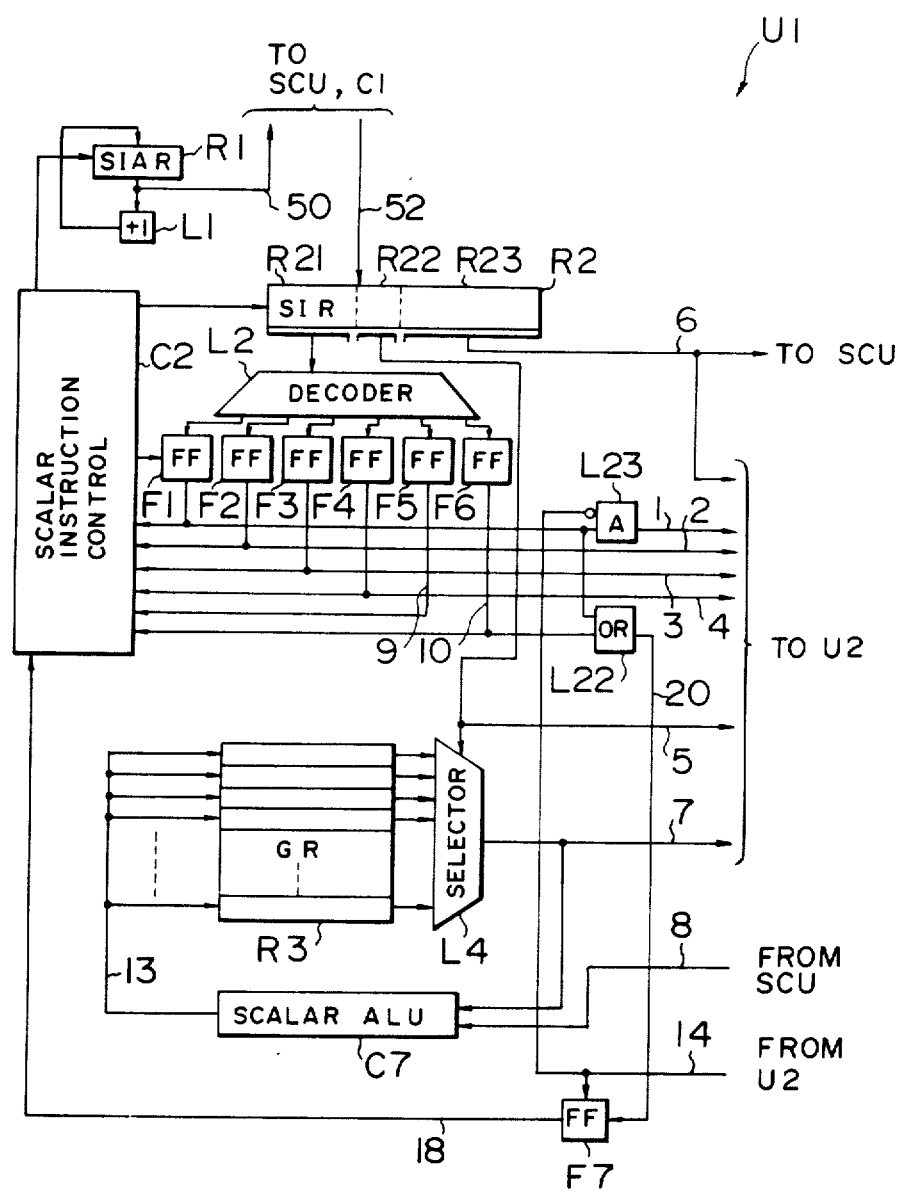
FIG. 9 shows a configuration of a scalar processing unit in accordance with a third embodiment of the present invention.

When the SSR instruction is set in the SIR R2 of U1 (FIG. 9), the content of the field R23 is sent to the SCU C1 through the line 6 and the SCU C1 fetches the scalar data specified by the address on the line 6 from the MS C3 onto the line 94 of U2 (FIG. 10). The content of the field R22 of the SIR R2 is supplied to the decoder L10 of U2 (FIG. 10) through the line 5 and it is used to set the data on the line 94 to the SR R8.

Step S2

Based on the field R23 of the SVAR instruction in the SIR R2, the address of the vector data necessary for the vector processing (1) is fetched from the MS C3 onto the line 94 and it is stored in the VAR R6 under the control of the decoder L8 to which the field R22 of the SIR R2 is supplied through the line 5.

Step S3

For the SVAIR instruction, the increment of the vector address is set to the VAIR R7 in the same manner as the steps S1 and S2.

Step S4

The content of the field R23 of the SVP instruction is supplied to the selector L21 through the line 6 and set in the VIAR R5.

Step S19

The content of the field R22 of the RSR instruction set in the SIR R2 is supplied to the selector L15 (FIG. 10) through the line 5. The selector L15 selects the SR R8 specified by the signal on the line 5 and sends it to the SCU C1 through the signal line 8. The content of the second field R23 of the SIR R2 is sent to the SCU C1 through the line 6 and the SCU C1 responds to the address of the field R23 to store the data on the line 8 into the MS C3.

In this manner, the data necessary for the vector processing is fetched from the MS C3 and set in the VPU U2 by one instruction.

In the first to third embodiments described above, the VLR R4 and the VIAR R5 are not duplexed because the data to be set in those registers can be prepared by only one SVP instruction and the preparation time is short. In order to increase the speed of the vector processing, these registers may be duplexed. More particularly, additional registers for those data and an additional instruction are provided and the additional instruction is executed prior to the execution of the SVP instruction to read out the vector length and the vector instruction address from the GR's R3 of the SPU U1 and set them in the additional registers in the VPU U2. Thereafter, the SVP instruction is executed. In this case, it is not necessary for the SVP instruction to read out the vector length and the vector instruction address from the GR's R3.

In the embodiments described above, a counter (not shown) for counting the operation time of the VPU U2 may be duplexed such that the SPU U1 sets a predetermined time into one of the counters and the VPU U2 counts down the other counter during its operation and the VPU U2 stops its operation when the operation time of the VPU U2 reaches the predetermined time. The SPU U1 can specify the next vector processing time during the operation of the VPU U2.

As described hereinabove, in accordance with the present invention, the vector processing and the scalar processing can be carried out in parallel. By duplexing the VAR, the VAIR and the SR used for the setup, the setup for the next vector processing can be carried out in parallel with the current vector processing so that the overhead of the setup is reduced. As a result, the speed of the vector processing is increased. Because more than one vector address increment and scalar data must be usually prepared for one vector processing, the duplication of the registers for those data is effective in increasing the speed of the vector processing.

What is claimed is:

1. A data processor comprising:
 a main storage for separately storing therein in respective storage locations vector data and scalar data as well as vector instruction chains and scalar instruction chains, so that vector instructions may be fetched independently of the fetching of scalar instructions;
 scalar instruction execution means, including a scalar instruction register, for fetching one of said scalar instruction chains into said scalar instruction register and one of said scalar data from said main storage, decoding the fetched scalar instructions, executing the decoded instructions and storing scalar data resulting from the execution of the instructions; and vector instruction execution means, including a vector instruction register, for fetching one of said vector instruction chains into said vector instruction register and one of said vector data, decoding the fetched vector instructions, executing the decoded instructions and writing vector data resulting from the execution of the vector instruction into said main storage;

said scalar instruction execution means including control means for effecting fetching and execution of scalar instructions in sequence regardless of whether or not said vector instruction execution means is operating for the execution of a vector instruction chain, so that said vector instruction execution means and said scalar instruction execution means can operate in parallel, and data supply means responsive to execution of a scalar instruction for supplying to said vector instruction execution means data obtained by scalar processing which is necessary for the execution of the next vector instruction chain following the vector instruction chain currently being executed, so that said data may be supplied to said vector instruction execution means in parallel with the execution of a current vector instruction chain therein, whereby said vector instruction execution means can execute the next vector instruction chain using the data supplied by said data supply means during a time when the scalar instruction execution means fetches and executes the next scalar instruction chain from said main storage.

2. A data processor according to claim 1 wherein said data supply means includes means for supplying an address of said main storage of the vector data to be used in the execution of the next vector instruction sequence.

3. A data processor according to claim 1 or 2 wherein said data supply means includes means for supplying an address increment representing the address difference between two succeeding data in said main storage for the vector data to be used in the execution of the next vector instruction chain.

4. A data processor according to claim 1 wherein said data supply means includes means for supplying scalar data to be used in the execution of the next vector instruction chain in said vector instruction execution means.

5. A data processor according to claim 1 wherein said data supply means includes means for supplying a start instruction address of the next vector instruction chain to said vector instruction execution means.

6. A data processor according to claim 1 wherein said data supply means includes means for supplying the number of elements of the vector data to be processed in the execution of the next vector instruction chain to said vector instruction execution means.

7. A data processor according to claim 1 wherein said data supply means includes means for supplying the data to said vector instruction execution means irrespectively whether said vector instruction execution means is in operation or not, said scalar instruction execution means includes means for instructing the start of the execution of the next vector instruction chain to said vector instruction execution means on the condition that said vector instruction execution means is not in operation, and said vector instruction execution means includes storing means for storing the supplied data irrespective of whether said vector instruction execution means is in operation or not and control means responsive to the instruction from said instruction means for controlling the execution of the next vector instruction chain using the stored data and informing said instruction means that said vector instruction execution means is in operation.

8. A data processor according to claim 7 wherein said data supply means includes means for supplying scalar operands to be used in the operation of the next vector instruction chain, said first store means includes a plurality of first scalar registers for storing the scalar operands, said second store means includes a plurality of second scalar registers each provided for a respective one of said first scalar registers, said vector instruction execution means includes means for writing the scalar data resulting from the execution of the vector instructions in the corresponding first and second scalar registers, and said scalar instruction execution means includes read means responsive to one of the scalar instructions for reading one of said first scalar registers.

9. A data processor according to claim 8 wherein said read means reads said scalar register on the condition that said vector instruction execution means is not in operation.

10. A data processor according to claim 7 wherein said data supply means includes means for supplying scalar operands to be used in the execution of the next vector instruction chain, said first store means includes a plurality of first scalar registers for storing the scalar operands, said second store means includes a plurality of second registers one for each of said first scalar registers, said vector instruction execution means includes means for selectively writing the scalar data resulting from the execution of the vector instructions to said second scalar registers, and said scalar instruction execution means includes means responsive to one of the scalar instructions to selectively read said second scalar registers.

11. A data processor according to claim 1 wherein said data supply means includes a plurality of scalar registers for storing data necessary for the execution of the next vector instruction chain following to the currently executed vector instruction chain and means responsive to the scalar instructions for reading the data from said scalar registers and supplying them to said vector instruction execution means.

12. A data processor according to claim 1 wherein said data supply means includes means for sending the address specified by the scalar instruction to said main storage, fetching the data from said main storage and supplying the data to said vector instruction execution means.

13. A data processor according to claim 1, wherein said vector instruction execution means includes further control means responsive to a start signal from said scalar instruction execution means for effecting fetching and execution of a vector instruction chain.

14. A data processor comprising:
a main storage for separately storing therein in respective storage locations vector data and scalar data as well as vector instruction chains and scalar instruction chains;
scalar instruction execution means, including a scalar instruction register, for fetching one of said scalar instruction chains into said scalar instruction register and one of said scalar data from said main storage, decoding the fetched scalar instructions, executing the decoded instructions and storing scalar data resulting from the execution of the instructions; and vector instruction execution means, including a vector instruction register, for fetching one of said vector instruction chains into said vector instruction register and one of said vector data, decoding the fetched vector instructions, executing the decoded instructions and writing vector data resulting from the execution of the vector instruction into said main storage;

said scalar instruction execution means including data supply means responsive to execution of a scalar instruction for supplying to said vector instruction execution means data necessary for the execution of the next vector instruction chain following the vector instruction chain currently being executed, so that said data may be supplied to said vector instruction execution means in parallel with the execution of a current vector instruction chain therein, whereby said vector instruction execution means can execute the next vector instruction chain using the data supplied by said data supply means; and wherein said vector instruction execution means includes first and second interconnected store means, said data supply means includes means for storing the supplied data to be used for the next vector instruction in said first store means and transfer means for transferring the data stored in said first store means to said second store means prior to the execution of the next vector instruction chain, whereby said vector instruction execution means executes the next vector instruction chain using the data stored in said second store means.

15. A data processor according to claim 14 wherein said first and second store means each includes a plurality of registers for storing addresses of said main storage of the vector data to be used in the execution of the next vector instruction chain.

16. A data processor according to claim 14 wherein said first and second store means each includes a plurality of registers for storing address increments representing the address difference between two succeeding data in said main storage for the vector data to be used in the execution of the next vector instruction chain.

17. A data processor according to claim 14 wherein said first and second store means each includes a plurality of registers for storing scalar data to be used in the execution of the next vector instruction chain.

18. A data processor according to claim 14 wherein said scalar instruction execution means includes start signal responsive to a scalar instruction executed in said scalar instruction execution means for sending a signal for instructing the start of the execution of the next vector instruction chain to said vector instruction execution means, and said transfer means includes means for transferring the data in response to said start of execution instruction signal.

19. A data processor according to claim 18 wherein said start signal means sends said start of execution instruction signal on the condition that said vector instruction execution means is not in operation.

20. A data processor according to claim 19 wherein said vector instruction execution means includes indication means for indicating whether said vector instruction execution means is in operation or not, and said instruction means includes means for generating said start of execution instruction signal and means for sending said instruction signal to said vector instruction execution means on the condition that said indication means indicates that said vector instruction execution means is not in operation.

21. A data processor according to claim 18 wherein said data supply means includes means for supplying the start instruction address of the next vector instruction chain to said vector instruction execution means when said start of execution instruction signal is sent.

22. A data processor according to claim 18 wherein said data supply means includes means for supplying the number of elements of the vector data to be processed in the execution of the next vector instruction sequence to said vector instruction execution means when said start of execution instruction signal is sent.

23. A data processor according to claim 18 wherein said vector instruction execution means includes means for storing the scalar data resulting from the execution of the vector instruction chain in the corresponding scalar data storing registers of said first and second store means, and said scalar instruction execution means includes means responsive to one of the scalar instructions to read out the scalar data stored in the scalar data storing register of said first store means.

24. A data processor according to claim 17 wherein said vector instruction execution means includes means for storing the scalar data resulting from the execution of the vector instruction chain in said second store means, and said scalar instruction execution means includes means responsive to one of the scalar instructions for reading out the scalar data stored in said second store means.

25. A data processor according to claim 23 or 24 wherein said scalar data read means sends the read data to said main storage.

* * * * *